United States Patent
Azgin et al.

(10) Patent No.: US 10,104,633 B1
(45) Date of Patent: Oct. 16, 2018

(54) ACTIVE POSITION DRIVEN MOBILITY CONTENT DELIVERY IN INFORMATION CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/476,788

(22) Filed: Mar. 31, 2017

(51) Int. Cl.
*H04W 64/00* (2009.01)
*H04W 8/08* (2009.01)
*H04W 60/00* (2009.01)
*H04L 12/26* (2006.01)

(52) U.S. Cl.
CPC ......... *H04W 64/00* (2013.01); *H04L 43/0864* (2013.01); *H04W 8/08* (2013.01); *H04W 60/00* (2013.01)

(58) Field of Classification Search
CPC ....... H04W 64/00; H04W 8/08; H04W 60/00; H04L 43/0864
See application file for complete search history.

(56) References Cited

U.S. PATENT DOCUMENTS

| | | | |
|---|---|---|---|
| 2003/0120817 A1* | 6/2003 | Ott | H04L 12/1859 709/249 |
| 2004/0157620 A1* | 8/2004 | Nyu | H04W 4/20 455/456.1 |
| 2012/0178473 A1* | 7/2012 | Wiren | G01S 5/0009 455/456.2 |
| 2013/0039249 A1* | 2/2013 | Ravindran | H04W 76/002 370/312 |
| 2014/0189060 A1* | 7/2014 | Westphal | H04W 36/0016 709/217 |
| 2016/0352614 A1* | 12/2016 | Valencia Lopez | H04L 45/021 |
| 2016/0366620 A1* | 12/2016 | Royon | H04L 67/10 |
| 2017/0034041 A1* | 2/2017 | Carofiglio | H04L 45/122 |
| 2017/0078185 A1* | 3/2017 | Yao | H04L 29/06 |

* cited by examiner

*Primary Examiner* — Khai M Nguyen
(74) *Attorney, Agent, or Firm* — FutureWei Technologies, Inc.

(57) ABSTRACT

The disclosure relates to technology providing seamless mobility to a mobile producer node. A request message is received from a requesting node in an information centric network. The request message includes mapping point parameters that have an identifier to identify a mapping server that serves requests targeting the mobile producer node and location-based metrics of the mobile producer node. The mapping point parameters are updated when the mobile producer node moves from a first network component to a second network component, and the updated mapping point parameters are provided to the requesting node in a response message sent from the mobile producer node. The request message may then be forwarded from the requesting node to the mobile producer node using the updated mapping point parameters.

11 Claims, 15 Drawing Sheets

FIG. 3C

344A:
| Content Name or Identifier 350 | Mobility Service Tags 352 | Publisher Key 354 | Consumer Key 356 |

344B:
| MaP Identifier 368 | Content Name or Identifier 370 | Current Location 372 | Delta Metrics 374 |

344C:
| Location Identifier 376 | Host Identifier 378 | Content Name or Identifier 380 |

344D:
| Host Identifier 382 | Content Name or Identifier 384 |

FIG. 3D

346A:
| Content Name or Identifier 358 | Mobility Service Tags 360 | Publisher Key 362 | MaP Identifier 364 | MaP Key 366 |

346B:
| Content Name or Identifier 386 | Payload 388 |

346C:
| Content Name or Identifier 390 | Payload 392 |

ACTIVE POSITION DRIVEN MOBILITY CONTENT DELIVERY IN INFORMATION CENTRIC NETWORKS

BACKGROUND

An Information centric network (ICN) is a network that allows applications to bind to application-centric identifiers (IDs) exposed to the network layer entity (ID can represent content, device, service, etc.), rather than to bind with one specific form of naming like an IP address that represents physical location where that data is to be retrieved from, named hosts.

In a regular host-centric network (for example, an Internet protocol (IP) network), data is exchanged based on one or more host addresses (for example, IP addresses). Packets are delivered based on an end-to-end principle from a source address to a destination address.

In an ICN, on the other hand, packets are exchanged based on the name of the content or data. A content-centric network (CCN) or named data network (NDN) is an example implementation of the ICN that permits fetching data identified by a given name. The potential benefits of ICN include content caching to reduce congestion and improve delivery speed, simpler configuration of network devices, and improved mobility support.

BRIEF SUMMARY

According to one aspect of the present disclosure, there is provided a method implemented by a network component of an information centric network for providing seamless mobility to a mobile producer node, comprising receiving a request message from a requesting node in the information centric network, the request message including mapping point parameters that include an identifier to identify a mapping server that serves requests targeting the mobile producer node and location-based metrics of the mobile producer node; updating the mapping point parameters when the mobile producer node moves from a first network component to a second network component, the updated mapping point parameters provided to the requesting node in a response message sent from the mobile producer node; and forwarding the request message from the requesting node to the mobile producer node using the updated mapping point parameters, the mobile producer node including content requested by the request message in the response message.

Optionally, in any of the preceding aspects, the method further comprises receiving a registration message from the mobile producer node attached to the first network component; sending a response message in response to the registration message, the response message including the mapping point parameters; receiving a discovery or recovery message from the requesting node, the discovery or recovery message including a namespace for the producer node hosting the content; returning locator information for the mobile producer node in response to the discovery or recovery message; and establishing a session between the mobile producer node and the requesting node during the session, wherein the mapping point and location parameters are provided by the mobile producer node to the requesting node, wherein the request message from the requesting node are forwarded to the mobile producer node at a current location of the mobile producer node using the location-based metrics.

Optionally, in any of the preceding aspects, wherein, when the mapping server receives the request message from the requesting node targeting the mobile producer node, further comprising determining which of the network components are responsible for providing coverage within a coverage area of the mobile producer node using the location-based metrics stored in a database of the mapping server; and updating the identifier with a corresponding one of the network component identifiers and forwarding the request message over a matching interface along a nodal path to the mobile producer node.

Optionally, in any of the preceding aspects, wherein, after the mobile producer node received the request message from the requesting node, further comprising forwarding a response message, including location information, to the requesting node along a reverse nodal path.

Optionally, in any of the preceding aspects, wherein location information includes a current location and directional metrics of the mobile producer node.

Optionally, in any of the preceding aspects, wherein the requesting node calculates the mobile producer node's location at a time of a next request message by extracting the location-based metrics and the mapping point parameters from the response message forwarded by the mobile producer node; calculating a round trip time between sending the request message and receiving the response message from the mobile producer node; anticipating the next request message delivery time to the mobile producer node; and determining the mobile producer node location using estimates of the round trip time and time at which the request message was delivered to the mobile producer node, and the directional metrics.

Optionally, in any of the preceding aspects, wherein the location-based metrics delivered with the request message include one or more of a currently estimated location of the mobile producer node, a location of the mobile producer node as reported by the mobile producer node at a time of transmitting a previous response message to the requesting node, and the location-based metrics used by the requesting node to estimate the location of the mobile producer node's current location.

Optionally, in any of the preceding aspects, the method further comprising determining a location of the network component within a domain of the mobile producer node; determining one of the network components nearest to the mobile producer node from the location-based metrics received from the requesting node; and exchanging messages with the mapping server to create a database including the locations of each of the network components and corresponding coverage areas.

Optionally, in any of the preceding aspects, wherein determining a location of the network component within a domain of the mobile producer node from location information comprises assigning the network components to regions of the domain based on a corresponding physical location; creating a database to determine the regions associated with the corresponding physical location; extracting a candidate set of the network components and information using the mobile producer node's location; and selecting one or more of the closest network components serving the mobile producer node.

According to one other aspect of the present disclosure, there is provided a non-transitory computer-readable medium storing computer instructions for seamless mobility to a mobile producer node in an information centric network, that when executed by one or more processors, perform the steps of receiving a request message from a requesting node in the information centric network, the request message including mapping point parameters that include an identifier to identify a mapping server that serves requests targeting the mobile producer node and location-based metrics of the mobile producer node; updating the mapping point parameters when the mobile producer node moves from a first network component to a second network component, the updated mapping point parameters provided to the requesting node in a response message sent from the mobile producer node; and forwarding the request message from the requesting node to the mobile producer node using the updated mapping point parameters, the mobile producer node including content requested by the request message in the response message.

According to one other aspect of the present disclosure, there is provided a network device for seamless mobility in an information centric network, comprising a non-transitory memory storage comprising instructions; and one or more processors in communication with the memory, wherein the one or more processors execute the instructions to: receive a request message from a requesting node in the information centric network, the request message including mapping point parameters that include an identifier to identify a mapping server that serves requests targeting the mobile producer node and location-based metrics of the mobile producer node; update the mapping point parameters when the mobile producer node moves from a first network component to a second network component, the updated mapping point parameters provided to the requesting node in a response message sent from the mobile producer node; and forward the request message from the requesting node to the mobile producer node using the updated mapping point parameters, the mobile producer node including content requested by the request message in the response message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 3C and 3D illustrate packet headers.

DETAILED DESCRIPTION

The disclosure relates to technology for providing seamless mobility to a mobile node in an information centric network.

Conventional information centric networks rely on content routers or dedicated controllers to re-establish connections when a mobile producer moves within a network or to another network. This results in the need to create, update or transfer states at the routers or controllers and may lead to temporary disconnection of the mobile producer from the network.

By applying the methodology in this disclosure, requests (interest messages) being sent from a consumer may be directed to the mobile producer at its current location, as opposed to a content router or controller. For example, a request message received from a consumer includes mapping point parameters with an identifier to identify a mapping server that serves requests targeting the mobile producer, along with location-based metrics of the mobile producer node. These mapping point parameters are updated as the mobile producer moves from a one network component to another network component (within or outside of the current network). The updated mapping point parameters are provided to the consumer in a response message (data packet) sent from the mobile producer, such that the request message may be forwarded to the mobile producer using the updated mapping point parameters.

It is understood that the present embodiments of the invention may be implemented in many different forms and that claims' scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

Figure 1:
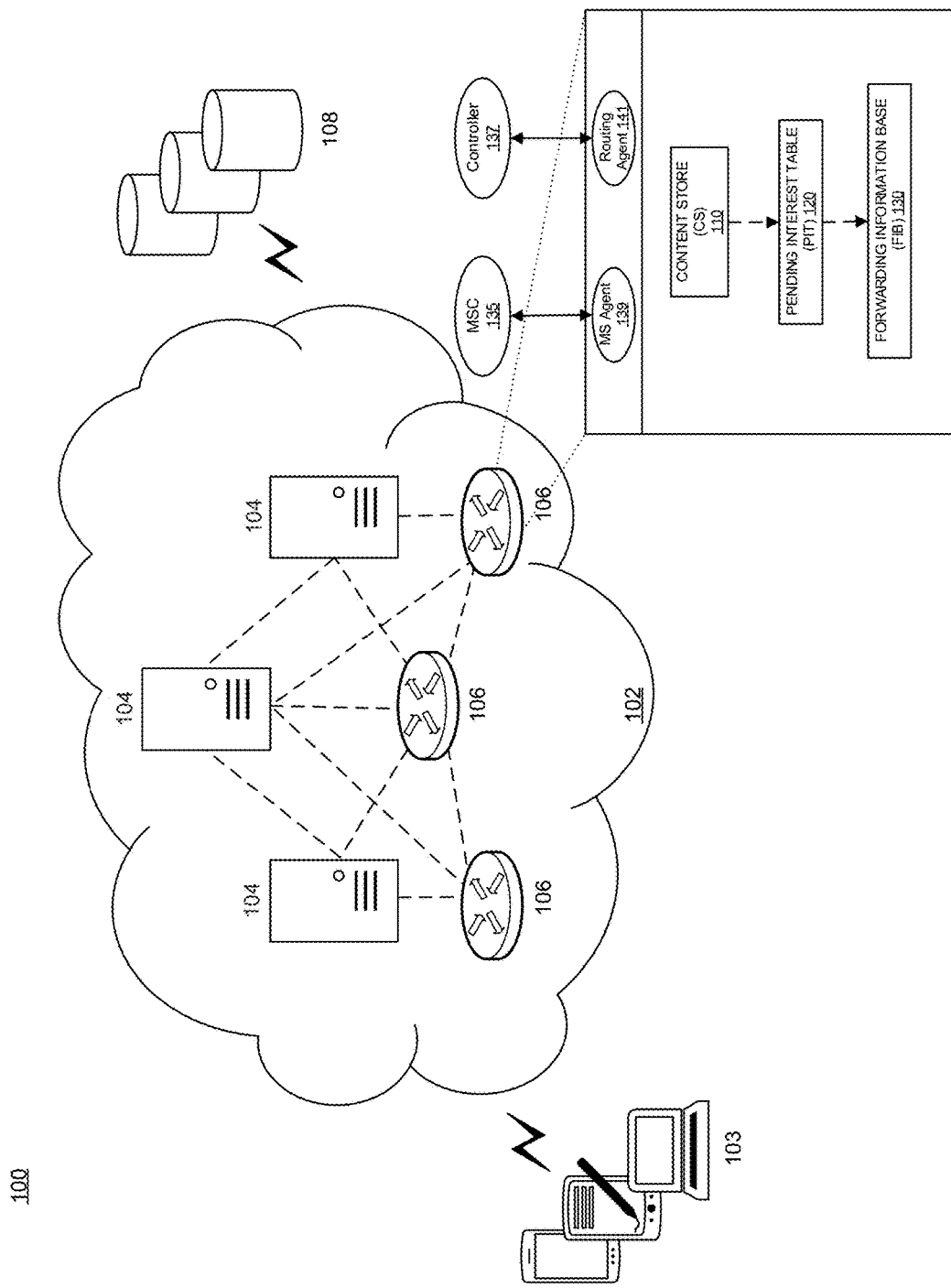
FIG. 1 illustrates a network architecture to provide content as requested by different users in an information centric network.

FIG. 1 illustrates a network architecture to provide content as requested by different users in an information centric network. The network environment 100 may include the ICN 102, also referred to as a content oriented network (CON), having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISP).

ICN 102 may also include routers (or nodes) 106, which may include storage to cache content as the content propagates through the ICN 102. The routers 106 may also be communicatively coupled with the ICN managers 104 and may be configured to process requests received from users for accessing the content via clients or user devices 103, such as a mobile, device or computer.

The routers 106 may collaborate for caching content with one or more other routers 106 in the network, such as an ICN 102, which may be configured as follows.

A router 106 may comprise a content store (CS) 110, pending interest table (PIT) 120, and forwarding information base (FIB) 130. The CS 110 may be used (e.g., in a storage or memory unit) to cache (for relatively short time)

or store (for relatively longer time) content data. The CS 110 may also receive and associate interests (user requests for content) with corresponding content data (requested content).

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching router 106 on which the interests were received.

The FIB 130 may be any data structure (e.g., a table, list, or database) used to associate content or namespace with corresponding ports or faces (for next hops) on which the interests and content data are received and forwarded, depending on the implemented forwarding policies. The FIB 130 entries may indicate the next hops on which content or packets (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the router 106.

To carry out the Interest and Data packet forwarding functions, the router 106 maintains the three data structures described above, namely: (1) a CS 110 acting as a temporary cache of Data packets the router has received, which cached Data packets may be used to satisfy future Interests; (2) a PIT 120 to store all the Interests (or a subset of them for which stateful forwarding is enabled) that a router has forwarded but not satisfied yet, where each PIT entry records the data name carried in the Interest (or a router designated name associated with the Interest), together with its incoming and outgoing interface(s); and (3) a FIB 130 as a routing/forwarding table which maps name components to interfaces, and is populated by a name-prefix based routing protocol for instance through the routing information base (RIB) for which the name prefix based routing protocol originates, and can have multiple output interfaces for each prefix. Additionally, the router 106 may include forwarding policies and rules to handle forwarding of packets.

In one example embodiment, when the router 106 receives an Interest packet (incoming interest), which includes for example the name of the content that the requester (client) wants to request, the router 106 first checks to determine if there is a locally cached copy of the content in the CS 110. If a locally cached copy of the content exists in the CS 110, the router 106 can reply to the Interest by sending the content copy to the incoming face of the Interest.

If no locally cached copy of the content exists, the content router 106 checks to determine if there are pending interests in the PIT 120 with the same content name. If a request targeting the same content name exists and is pending, then the incoming face of the new Interest is added to the incoming face list for the content name in the PIT 120. Accordingly, the new interest is no longer required to be forwarded.

Otherwise, the router 106 forwards the Interest by performing a lookup, such as a longest-prefix matching based lookup, in the FIB 130 based on the content name. The Interest is then stored in the PIT 120 by creating a new entry. If no matched entry is maintained in the FIB 130, then the Interest is either dropped or forwarded to a face or a multiple of faces other than the incoming face, depending on the forwarding strategy implemented by the receiving router.

The network environment 100 may further include content or data stores 108, which may store the content or collections of content, such as files, images, videos, and the like. Accordingly, the managers 104 and the routers 106 may communicate with the data stores 108 to provide the content to different users. Additionally, the network environment 100 may include one or more user devices 110, including for example and without limitation, desktop computers, handheld devices, laptops or other portable computers, network computers, mobile phones, landline phones, and the like.

The router 106 may also include a mobility service (MS) agent 139 and a routing agent 141 in communication with a mobility service controller (MSC) 135 and an ICN network controller 137, respectively. MSC 135, as the term is used herein, may encompass any system capable of tracking a network connection to a mobile data device (or mobile producer node) and for routing data to the mobile data device, and can include a Mobile IP home agent, a cellular digital packet data (CDPD) mobile data intermediate system (MDIS) or any other suitable system. An MSC 135 can also be a data processing system operating a computer program that directs the data processing system to track the network connection of a mobile data device. The MS agent 139 is an interface at the router 106 to communicate with MSC 135.

In one embodiment, when entities (e.g., consumers and producers) register to a network for mobility service, interest and data packets may be marked by setting a mobility flag.

In another embodiment, the MSC 135 is a service controller that is responsible for managing service profiles and resolving mapping of names for requests received from the ICN 102 to locators (e.g., domain identifiers or map identifiers). For example, service profiles may include mobility service specification and service level agreements (SLAB) (e.g., geographic limits for providing the mobility service). Within the MSC 135, the entity that maps services and names with the associated mobility requirements is referred to as a user profile manager. With the assistance of the MSC 135, mobility-as-a-service can be enabled and allow content providers to request to have mobility service enabled for their subscribers. In this case, the MSC 135 would push policies into the ICN 102 to provide mobility support for the corresponding service flows.

The controller 137 manages the network virtualization of the ICN 102 by monitoring the available compute capacity within and satisfying the requests from a service orchestrator (not illustrated) to provision the system resources (e.g., forwarding tables) based on the service requirements. The service orchestrator is responsible for exposing application programming interfaces (APIs) to heterogeneous services to request the desired service with meta information, such as geographical distribution of demand and/or performance, among other features. The routing agent 141 is an interface at the router 106 to communicate with the controller 137.

Figure 2:
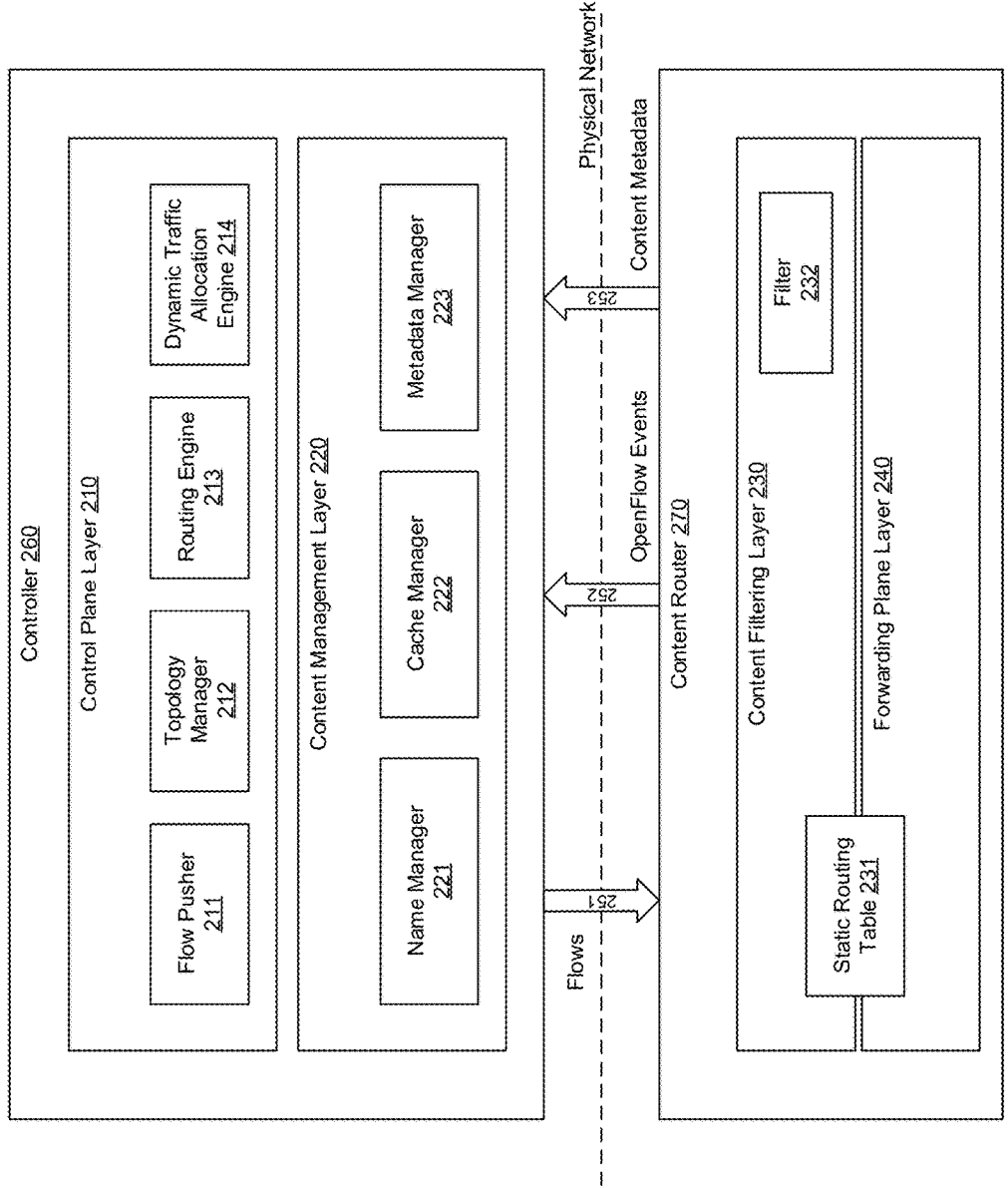
FIG. 2 illustrates an example content router and controller in accordance with FIG. 1.

FIG. 2 illustrates an example content router and controller in accordance with FIG. 1. A network, such as ICN 102, may comprise a controller 260 (such as ICN manager 104) and a content router 270 (such as content router 106). The controller 260 and the content router 270 may communicate via flows 251, OpenFlow events 252, and/or content metadata 253 through the ICN 102. For example, the flows 251 may carry configurations (e.g. network forwarding paths) for the content router 270, the OpenFlow events 252 may carry events (e.g. statistic reports) that occur at the content router 270, and the content metadata 253 may carry content attributes (e.g. content prefix sizes).

The controller 260 may comprise a control plane layer 210 and a content management layer 220. The control plane layer 210 may be substantially similar to a software defined network (SDN) control plane. For example, the control plane layer 210 may comprise a flow pusher 211, a topology manager 212, a routing engine 213 and a dynamic traffic allocation engine 214.

The topology manager 212 may be configured to manage, build, and maintain a global network topology view of the ICN 102 including, for example, network nodes (e.g., content router 270) and corresponding interconnections.

The routing engine 213 may be configured to compute forwarding paths and determine the best paths (e.g., flows) through the ICN 102.

The flow pusher 211 may be configured to push the paths for flows to the content router 270.

The dynamic traffic allocation engine 214 may be configured to dynamically allocate network resources to transport traffic in the ICN 102 and may adapt to changes in network conditions and/or network deployments.

The content management layer 220 may be an augmented layer to the control plane layer 210. The content management layer 220 may manage content, content caching, and content routing rules in the ICN 102 in addition to the SDN control and management functions performed in the control plane layer 210. For example, the content management layer 220 may comprise a name manager 221, a cache manager 222, and a metadata manager 223.

The name manager 221 may be configured to manage contents, contents' identifications, contents' naming, and/or content semantics (e.g. mappings to TCP/IP semantics in an IP-based network).

The cache manager 222 may be configured to manage and control contents for caching, content caching locations, and/or content request statistics in the ICN 102.

The metadata manager 223 may be configured to track and maintain attributes and/or any other auxiliary data (e.g., length of content prefixes, etc.) associated with the contents tracked and/or monitored by the controller 260 (e.g., at the name manager).

In an embodiment, the cache manager 222 may classify contents according to some popularity measures, determine the types of contents for caching and/or caching locations, and/or determine content routing rules (e.g., operate in conjunction with routing engine 213 in the control plane layer 210) according to the popularity measures. For example, the cache manager 222 may classify content popularities into categories. The cache manager 222 may also update popularity classification of contents and/or re-allocate caches and/or re-distribute content routing rules, for example, according to statistics of content request and/or access frequencies.

The content router 270 may include a forwarding plane layer 240 and a content filtering layer 230. The forwarding plane layer 240 may be substantially similar to a SDN forwarding plane in which data forwarding is performed according to flow tables configured by the controller 260. The content filtering layer 230 may be an augmented layer to the forwarding plane layer 240 and may interact with the content management layer 220 in the controller 260 for content routing.

The content filtering layer 230 may filter incoming content requests from clients (such as clients or user devices 103) prior to directing the forwarding plane layer 240 to forward the requests. For example, the content router 270 may include a static routing table 231 (such as FIB 130) located across both the forwarding plane layer 240 and the content filtering layer 230 and a bloom filter 232 located in the content filtering layer 230.

The static routing table 231 may comprise a plurality of routing rules (e.g. local rules) for a first content type (e.g., popular contents). The bloom filter 232 may be configured as a content indicator to indicate contents of a second content type (e.g., less popular contents) different from the first content type. For example, the bloom filter 232 may comprise encoded hashed content names for the second content type. The content filtering layer 230 may direct the forwarding plane layer 240 to forward content requests that are different from default routing paths based on filtering results.

In an embodiment, when the content router 260 receives an incoming request for a content, the content filtering layer 230 may process the request prior to passing the request to the forwarding plane layer 240. The content filtering layer 230 may check the request against the static routing table 231 to find an entry associated with the requested content. If an entry is found in the static routing table 231, the content filtering layer 230 may direct the forwarding plane layer 240 to route the request according to the routing rule in the entry.

If an entry is not found in the static routing table 231, the content filtering layer 230 may check the request against the bloom filter 232 to determine whether the requested content matches one of the less popular contents in the bloom filter 232. If a match is found, the content filtering layer 230 may send a query to the controller 260 to request the controller 260 to resolve a location for the request. In response to the request, the controller 260 may return a forwarding path. After receiving the forwarding path, the content filtering layer 230 may direct the forward plane layer 240 to forward the request according to the received forwarding path. If a match is not found in the bloom filter 232, the content filtering layer 230 may forward the request according to a default path (e.g., a default IP route for IP-based network or towards an origin server of the contents for content centric networking (CCN)). An example flow of an incoming request traversing a path in the network is described below with reference to FIGS. 4A-4C.

Figure 3A:
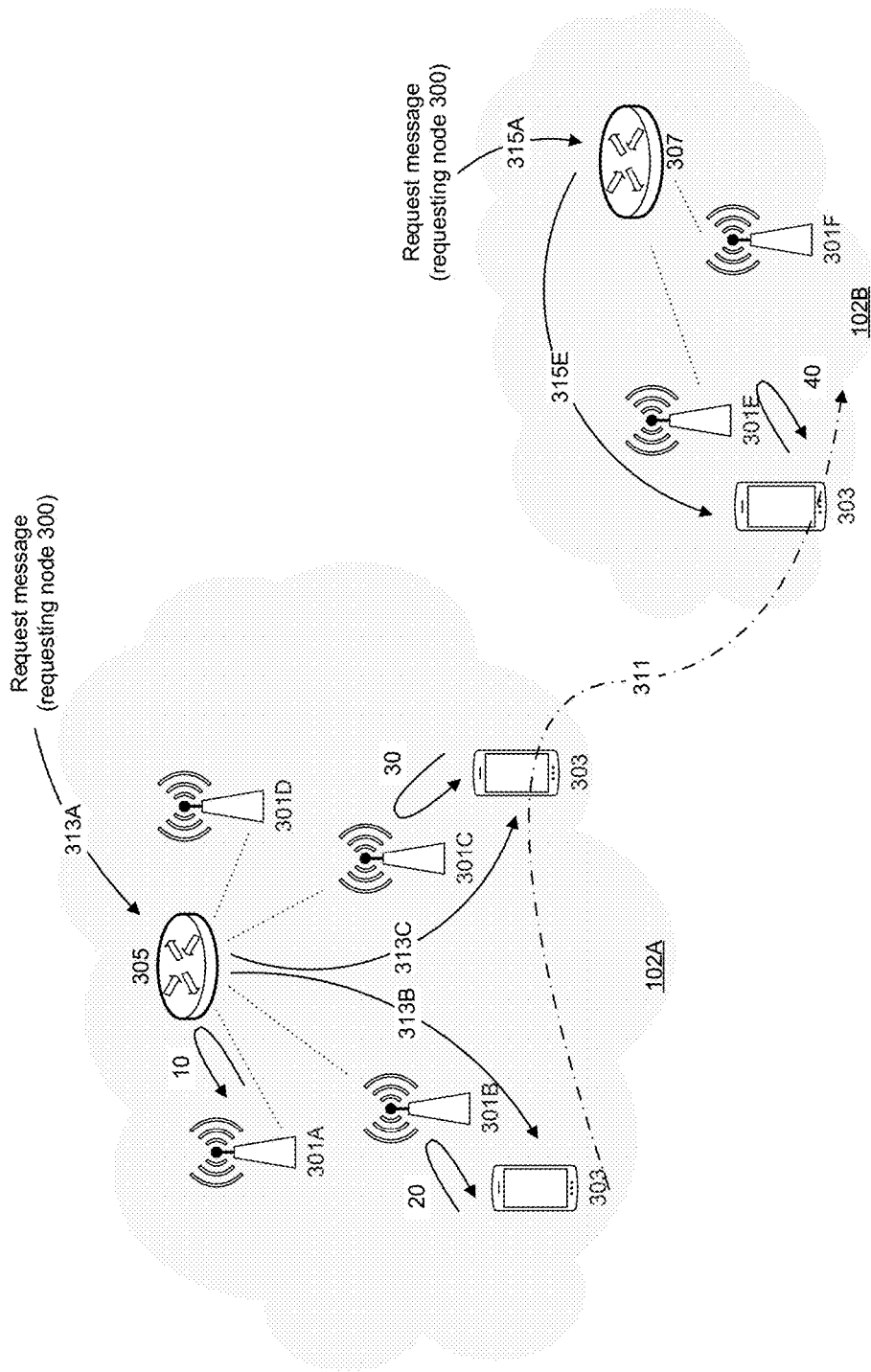
FIGS. 3A and 3B disclose an example flow diagram and sequence chart of procedures triggered by a mobile host as well as initial discovery and registration of a mobile host.
Figure 3B:
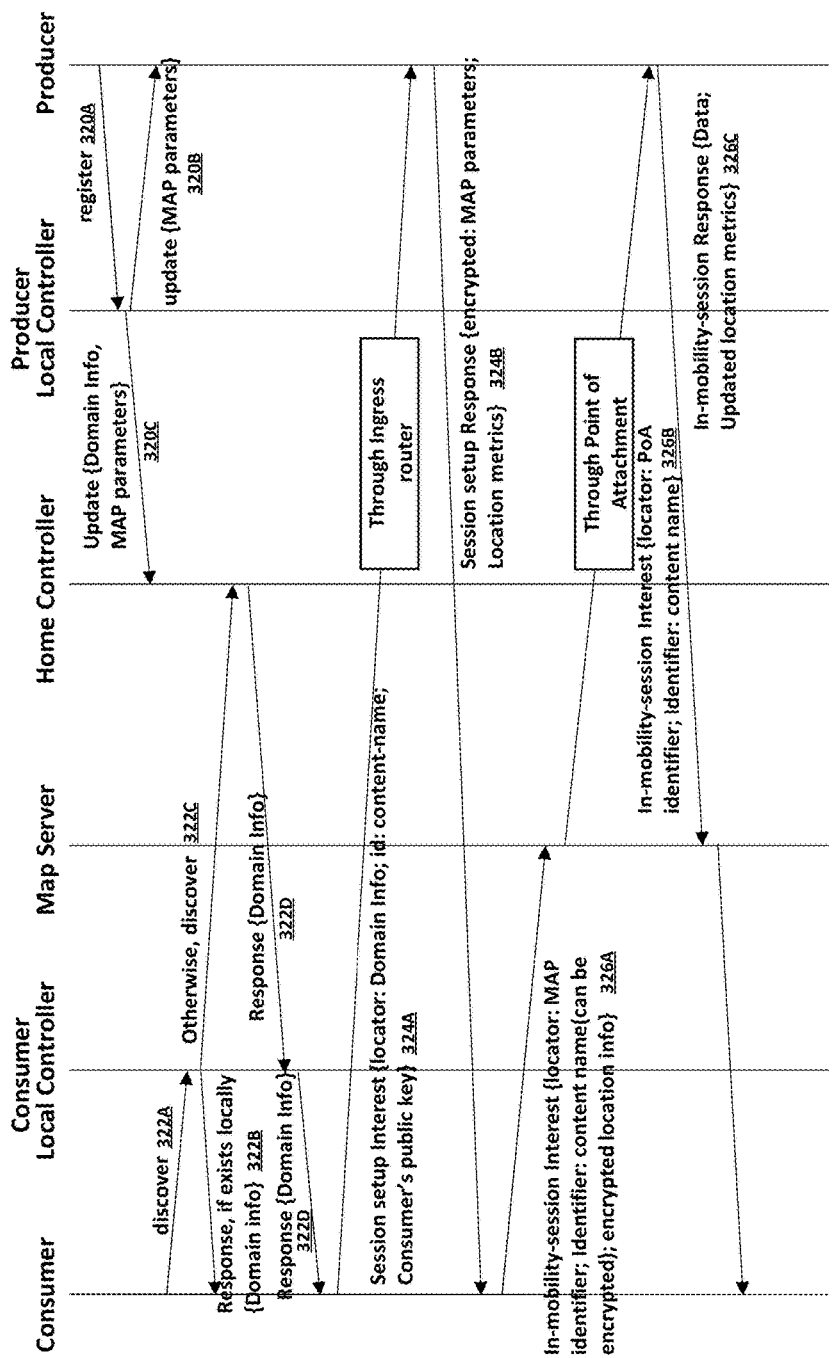

FIGS. 3A and 3B disclose an example flow diagram and sequence chart of procedures triggered by a mobile host as well as initial discovery and registration of a mobile host. With reference to FIG. 3A, an ICN, such as ICN 102A or 102B, can include one or more network nodes 305 or 307 (also referred to as ICN nodes, routers, or forwarders) and serve one or more data consumers (also referred to as a client or requesting node) 300 (FIG. 4B) and one or more data producers/providers 303 (also referred to as producers or providers, user equipment (UE), mobile producer or provider nodes, or mobile producer or provider devices).

The mobile producer node 303 attaches to a network component 301A-301F (also referred to as a Point of Attachment or PoA), which may be a node in the ICN 102A or 102B and provides network access to the mobile producer node 303. A point of attachment may be, for example, any network node that interconnects with the mobile node at the network protocol layer (e.g., at the Open Systems Interconnection (OSI) model Layer Three (L3)). The point of attachment may be a base station (BS), such as in cellular networks or the Institute of Electrical and Electronics Engineers (IEEE) standard 802.11 networks. Alternatively, the point of attachment may be an access or edge gateway of the network that may be coupled to one or more BSs.

The network nodes 305 and 307, in one embodiment, are mapping point servers that include a mapping point (MaP) detailing mapping parameters, such as location-based based metrics, of the point of attachments 301A-301D and 301E-301F, for the mobile producer node 303, in ICN 102A and 102B, respectively. For example, the mapping point servers 305 and 307 may include a database of locations for each of the point of attachments 301A-301F and corresponding coverage areas within a specific ICN 102A or 102B, as described further below with reference to FIGS. 6A and 6B.

Within the context of the embodiments that follow, seamless producer mobility as a service in the ICN 102A or 102B is employed. That is, the flow of the diagrams and associated methodology relate to the mobility of the mobile producer node 303, not the requesting node 300. However, it is appreciated that the embodiments are not limited to such a disclosure and that the embodiments may equally apply to consumer mobility.

Communication in ICNs 102A and 102B include the exchange of two types of packets: an interest packet (also referred to herein as a request message) and a data packet (also referred to herein as a response message). A data consumer (or requesting node) 300 can specify the name of a desired piece of data (content) in a request message and send the request message to the network via path 313A or 315A. Routers 305 and 307 may use the name to forward the request message toward mobile producer nodes 303 via respective paths 313B, 313C and 315E.

Once the request message reaches a node that has the requested data, such as mobile producer node 303, the node will return a data packet that contains both the name and the content. The data packet can follow, in reverse, the path taken by the request message to get back to the requesting node.

In order to transmit a request message with the ICN 102A or 102B, mobile producer node 303 and a requesting node (such as the consumer) 300 are first registered and discovered within a specific ICN 102A or 102B. Such discovery and registration procedures are depicted in the example of FIG. 3B. In one embodiment, during mobile producer node registration 320A, the mobile producer node registers with the producer local controller, which responds back with local information (which may be in the form of an update message), such as mapping point parameters, hosting domain information and the mapping point public key, at 320B. The mobile producer node 303 also informs the home controller with information such as the domain information and mapping point public key information at 320C.

In another embodiment during registration, the mobile producer node 303 registers at 320A with the local controller including information about the registered namespace(s). The mobile producer node 303 may also or alternatively register with the home controller in the home domain and acquire information from the home controller at 320C. In this case, the local controller may communicate with the home controller to provide additional information on the current domain, including mapping point parameters. That is, the mobile producer node 303 may regularly send updates regarding its location to its home controller, with information on the host domain.

At 322A, the requesting node (consumer) 300 uses a discovery procedure to reach the mobile producer node 303. The discovery procedure, which is employed during an initial discovery or recovery, may be any well-known procedure, such as, but not limited to, enumeration request discovery, regular interest discovery, alias mapping, etc.

If the information to reach the mobile producer node 303 exists at the local controller of the requesting node 300, then a response message is sent back to the requesting node 300 with the domain information associated with the mobile producer node 303 at 322B. Otherwise, the request message is forwarded to the home controller of the mobile producer node to provide a response message with the domain information at 322D (as will be the case during a request message during initial discovery or during recovery). In one embodiment, the mobile producer node 303 returns the information to the requesting node 300 within the response message through the home controller.

In one example, tunneling may be used to send the response.

In another example, a name-to-controller mapping may be used to realize the delivery of discovery messages. If no controller use is implemented, a service router chain based approach can be used to discover the mobile producer node's 303 location within a domain by forwarding messages to the next node in chain at the ingress router. In this case, it is assumed that the mobile producer node 303 registers its "mobile" namespace at the first service router visited. The namespace is then chained to the current service router through update messages after each intra-domain handover (scope can be limited to a small set of service routers, which allows for quick discovery of the mobile producer location node for the initial request).

In one embodiment, when link failure occurs, for example due to temporary disconnection as a result of wireless domain failures, a recovery procedure is employed, for which the procedure may be the same as the discovery procedure described herein above.

In one embodiment, information in discovery procedure (request message) is sent in a packet header 344. The packet header 344 may include the content name or identifier 350, mobility service tags 352, a publisher key 354 and a consumer key 356, as illustrated in FIG. 3C. In one embodiment, the request message (interest packet) may include encrypted location data, where the location data may be determined by applying any one or more of the following: currently estimated location (smallest overhead), location reported by the mobile producer node and the estimated location, the location reported by the mobile producer node and incremental metrics to find the requesting node's estimate of the mobile producer node's current location.

In one embodiment, the location data may also be encrypted using the MaP's public key (described below) such that eavesdropping on the received request and response messages will not provide any information.

Different formats (headers) may be used in the request message when communicating between the requesting node 300 and the producer node 303. For example, different formats may be employed for the Consumer-to-MaP and the MaP-to-Producer communications. Moreover, different encryption keys may be used when transmitting the messages.

Depending on the level of support received from the network, Consumer-to-MaP communication can utilize different naming schemes. In one embodiment, a Location identifier (/MaP's location) may be used, which would make location-based look-ups global (as packets with location identifier can be routed at the global level). In another embodiment, a Name identifier (/MaP) may be used, which limits location-based look-ups to within a domain.

In one other embodiment, MaP can be an Anycast identifier rather than a Unicast identifier such that information is replicated at multiple locations within a domain, allowing for better load balancing and improved reliability (failure of a MaP does not affect the operations within a domain). If Anycast is employed, the encryption keys may be shared within a domain.

In another embodiment, information returned in the discovery procedure (response message) is sent in packet header 346. Packet header 346 may include the content name or identifier 358, mobility service tags 360, a publisher key 362, a MaP identifier 364 and a MaP key 366, as illustrated in FIG. 3D In one non-limiting embodiment, and for enhanced security purposes, the request message may include one or more of the following information: mapping point's (MaP's) public key and encrypted location data (encrypted using the requesting node public key). In this case, the requesting node 300 provides its public key to the mobile producer node 303 with the initial request message (although not limited to the initial request message). In one embodiment, the location data is a combination of a current location and directional metrics, as explained below. With this information, the requesting node may then use the directional information based on round trip time (RTT) estimates (estimating the mobile producer node's future location at the time the mobile producer node is supposed to receive the request message).

The mobility service tags 352 and 360 may be used, for example, to notify a node that a mobility service is being employed.

The publisher key 354 and 362 and consumer key 356 may be optionally employed to encrypt messages between the requesting node 300 and the mobile producer node 303.

A MaP identifier 364 identifies which MaP server 305 or 307 is responsible for a mobile producer node 303, and the MaP key 366 may be used to encrypt data in the request and response messages.

At 324A, the requesting node 300 sends a request message (i.e., session setup interest message) to establish a session with the mobile producer node 303. The request message may include, for example, domain information, identifying information, such as the content name, and the requesting node public key. In response, the mapping point and location parameters are provided by the mobile producer node 303 to the requesting node 300 at 324B. In one embodiment, the exchange of messages is encrypted.

After session setup has been completed (i.e., after discovery), subsequent request messages sent from the requesting node 300 to the mobile producer node 303 use location-based packet forwarding, as the requesting node 300 and the mobile producer node 303 are now deemed to be in an in-mobility session. That is, request messages are forwarded within the domain in which packet headers provide the necessary location-based information. For example, at 326A, a request message (in-mobility session interest message) and with reference to FIG. 3C, is forwarded by the requesting node to the mapping server 305 or 307.

As identified in FIG. 3C, packet header 344B includes MaP identifier 368, Content name or identifier 370, current location 372 and delta metrics 374. The MaP identifier 368 and content name or identifier 370 are described above and are not repeated herein. The current location 372 is the current location of the mobile producer node 303 as last communicated to the requesting node 300, and the delta metrics are location information calculated to determine the difference in the mobile producer node 303 location from its prior location, as explained further below. In one embodiment, the content name or identifier 370, the current location 372 and the delta metrics 374 may be encrypted.

The request message is forwarded from the MaP server 305 or 307 to (or via) a point of attachment (e.g., 301B) using packet header 344C in the request message. Packet header 344C includes, for example, a location identifier 376, a host identifier 378 and a content name or identifier 380. In one embodiment, the content name or identifier 380 may be encrypted.

The point of attachment 301B then forwards the request message to the mobile producer node 303, where the request message include packet header 344D (FIG. 3C). Packet header 344D includes a host identifier 382 and content name or identifier 384. In one embodiment, the content name or identifier 380 may be encrypted. In another embodiment, a consumer key may be included to encrypt portions of the response message.

At 326B, the mobile producer node 303 responds to the request message by forwarding a response message back to the requesting node 300 via the MaP server 305 or 307. In one embodiment, the messaging includes locator information, such as the point of attachment identifier and content name identifier, along with the payload. For example, packet headers 346B (point of attachment to MaP) and 346C (MaP to requesting node) include content name or identifier 386/390 and payload 388/392. In one embodiment, the content name or identifier 380 may be encrypted.

The in-mobility session, in which location-based packet forwarding occurs, will be employed until such time that a failure occurs requiring a recovery procedure to be instituted. When recovery becomes necessary, the discovery procedure above is re-initiated.

Referring back to FIG. 3A, and after registration and discovery have been completed, the point of attachment, such as 301A, in network 102A will initially exchange messages with a MaP server, such as MaP server 305, to setup and configure the mapping procedure, at 10. This is followed by the mobile producer node 303 exchanging messages with the current point of attachment, such as point of attachment 301B, to acquire information on or from the MaP server 305 at 20. The information acquired on or from the MaP server 305 helps with directing packets to the mobile producer node 303 (or to its location).

It is appreciated that since the MaP server 305 does not act as an anchor for the mobile producer node 303, no further registration is required by the by the mobile producer node 303 at this time. In one embodiment, the MaP server may be found using the Anycast method, which is a network addressing and routing method using datagrams from a single sender to route to the topologically nearest node in a group of potential receivers (though it may be sent to several nodes), all identified by the same destination address.

In one embodiment, hierarchical names are sufficient to identify the Anycast MaP servers. Since Anycast is used, requests can be forwarded to any mapping server that shares the same private key to decrypt packet headers (if needed), and may support asymmetric forwarding, in the case of a mobile consumer, which would require the mobile consumer to include its location information/metrics (and its mapping server) within its requests. Similarly, this information may also be encrypted to prevent eavesdropping along the reverse path.

When the mobile producer node 303 changes a point of attachment (within the same network or in a another network), it is desirable for the networks 102A and 102B to provide continuous connections in the event of network configuration such as mobile producer node 303 mobility (i.e., when the mobile producer node moves). In one embodiment, the mobile producer node 303 changes its location within the network 102A (intra-domain) from a first point of attachment 301B to a second point of attachment 301C along path 311. In this case, the mobile producer node 303 re-attaches to the second point of attachment 301C without having any active change occur in regards to the MaP server 305. That is, since the mobile producer node 303 remains within the network 102A, the mapping parameters stored by the producer node or its home controller, if shared, do not require any update. Re-attaching to a point of attachment within a same network or domain is discussed in more detail below.

In another embodiment, the mobile producer node 303 changes its location from a point of attachment 301C in one network 102A to a point of attachment 301E in another network 102B (inter-domain). In this case, the mobile producer node 303 is handed over to the second point of attachment 301E in network 102B, requiring an active change to occur in regards to the MaP server 305. Re-attaching to a point of attachment within a different network or different domain is discussed in more detail below.

FIGS. 4A-4H illustrate flow diagrams of a data packet traversing a network in accordance with FIGS. 1, 3A and 3B. Although a limited number of local and home controllers (LCs and HCs), point of attachments 416P, 418P1, 418P2, 418/420P1, 420P1 and 420P2, mobile producer nodes 303, content routers 416C, 418C, 420C and 422C, and servers 416A, 416B, 418A, 418B, 420A, 420B and 422A-422B are illustrated in the disclosed embodiment, it is appreciated that any number of subscribers, routers and nodes may appear in the network. It is appreciated that the procedures described herein may be implemented by any node in the network.

Figures 4A, 4B:
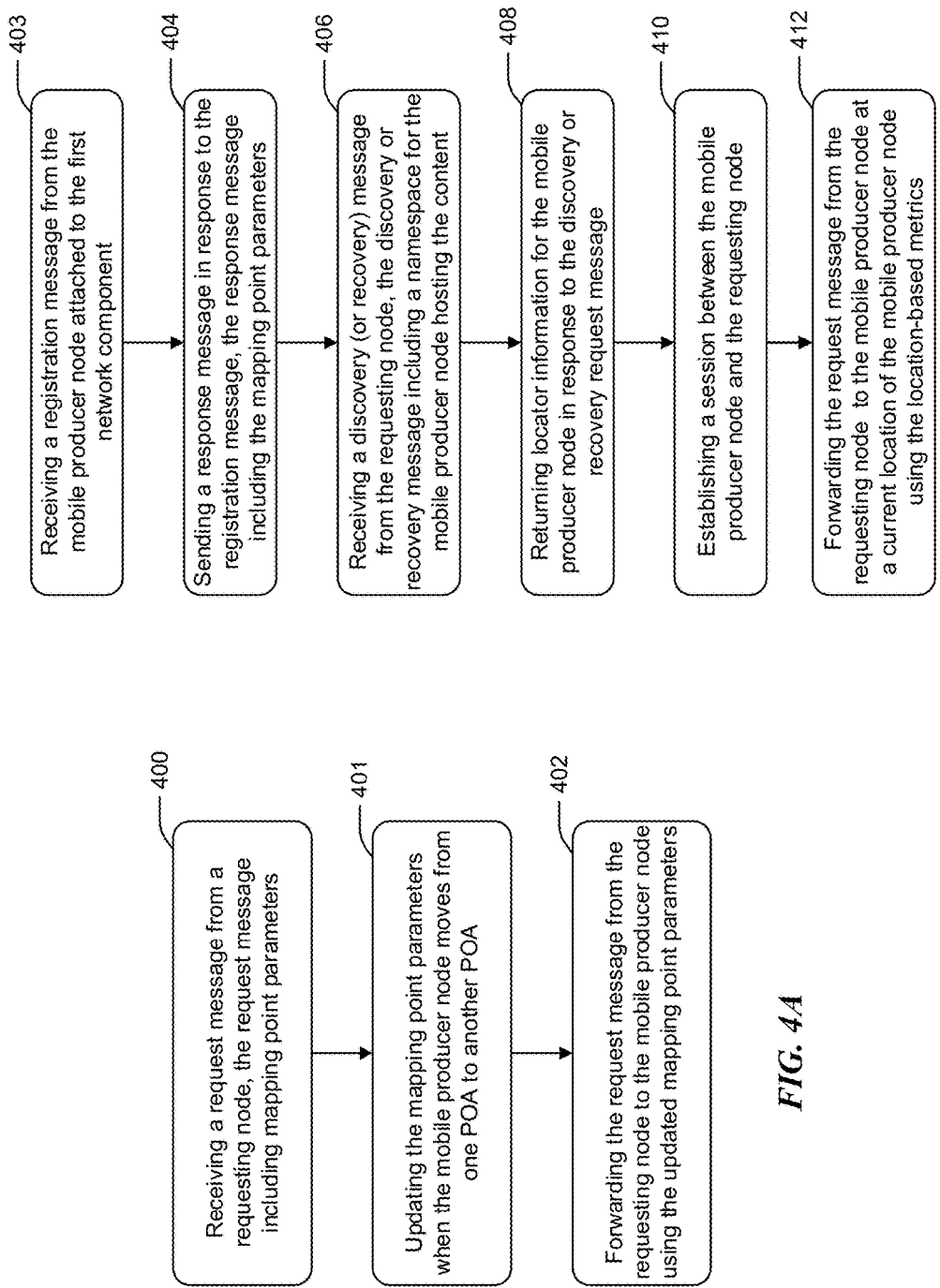
FIGS. 4A-4H illustrate flow diagrams of a data packet traversing a network in accordance with FIGS. 1, 3A and 3B.

FIG. 4A illustrates an example flow diagram of providing seamless mobility for a mobile node. At 400, a request message is received from a requesting node 300, such as a consumer. The request message includes mapping point parameters that include an identifier to identify a mapping server to serve requests targeting a mobile producer node 303, such as a content producer, and location-based metrics of the mobile producer node 303. As the mobile producer node 303 moves from one network component, such as point of attachment 301A, to another point of attachment, such as point of attachment 301C or 301E, the mapping point parameters may be updated and provided to the requesting node 300 in a response message from the mobile producer node 303. Upon receiving the updated mapping parameters, the requesting node 300 can forward a request message to the mobile producer node using the updated mapping parameters, as explained further below.

Figure 4C:
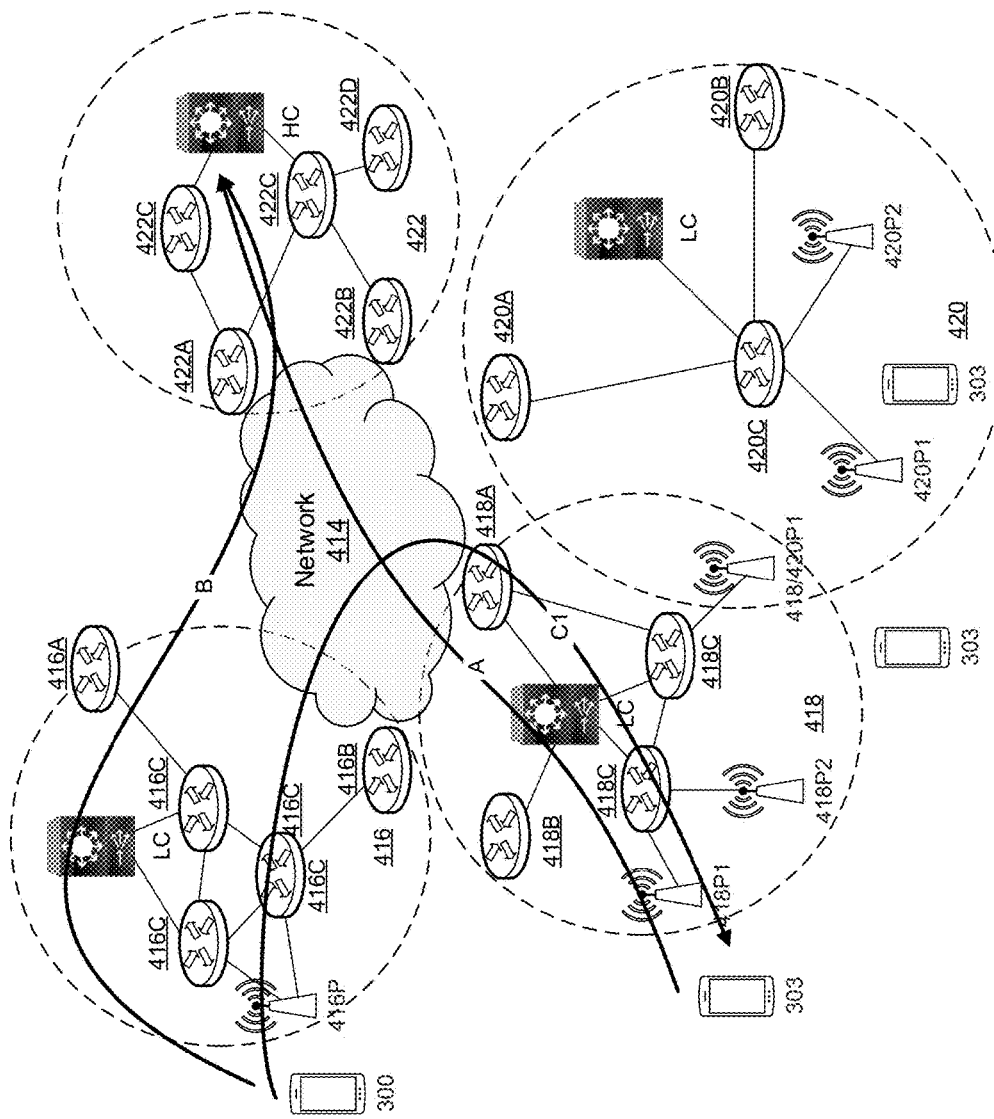

With reference to FIGS. 4B and 4C, the process of registration and discovery is illustrated, similar to the discussion above in FIGS. 3A and 3B. Along path A, the mobile producer node 303 seeks to update the home controller HC (and register with the local controller LC). At 402, the home controller HC of the mobile producer node's 303 home domain in network 422 receives a registration message from the mobile producer node 303 attached to point of attachment 418P1. In one embodiment, the request message may be sent through the local controller LC of network 416. In response, the home controller HC sends a response message to the mobile producer node 303 including mapping point parameters at 404.

Along path B, the requesting node 300 triggers a discovery for the mobile producer node's 303 namespace (location). At 406, a discovery request (or recover request) message is sent from the requesting node 300 to the home controller HC through local controller LC of network 416, for example, along nodal path B. The discovery or recovery request message includes a namespace for the mobile producer node 303 hosting the content. In response to the discovery or recovery request, the home controller HC returns locator information for the mobile producer node 303 at 408, at which time a session between the mobile producer 303 and the requesting node 301 may be established at 410.

Along path C1, the requesting node sends request message to the mobile producer node 303 (first using its namespace, then using its location). At 412, the requesting node 300, after establishing a session with the mobile producer node 303, may now forward a request message (interest messages) along nodal path C1 to the mobile producer node 303 at a current location of the mobile producer node 303 using location-based metrics previously provided to the requesting node 300. In the first instance of forwarding such a request message, it may be considered a discover request message since the requesting node 300 does not have all information about the mobile producer node 303 available to it at this time.

Figure 4D:
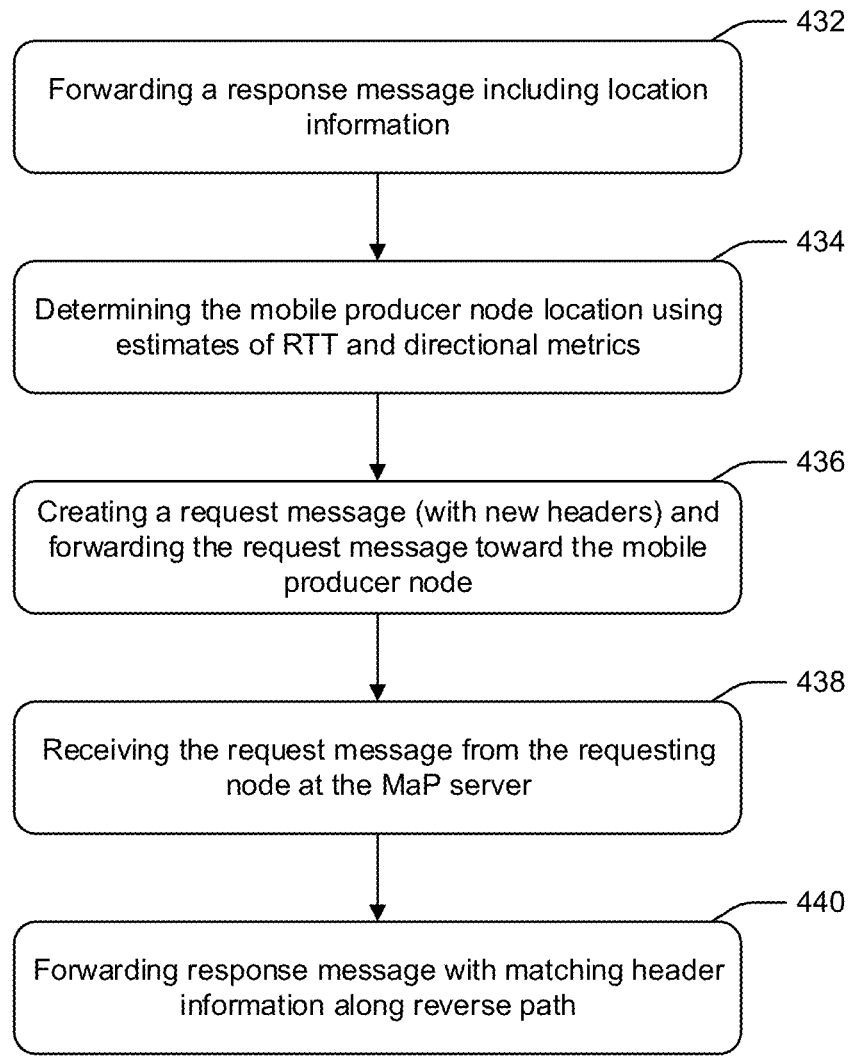
Figure 4E:
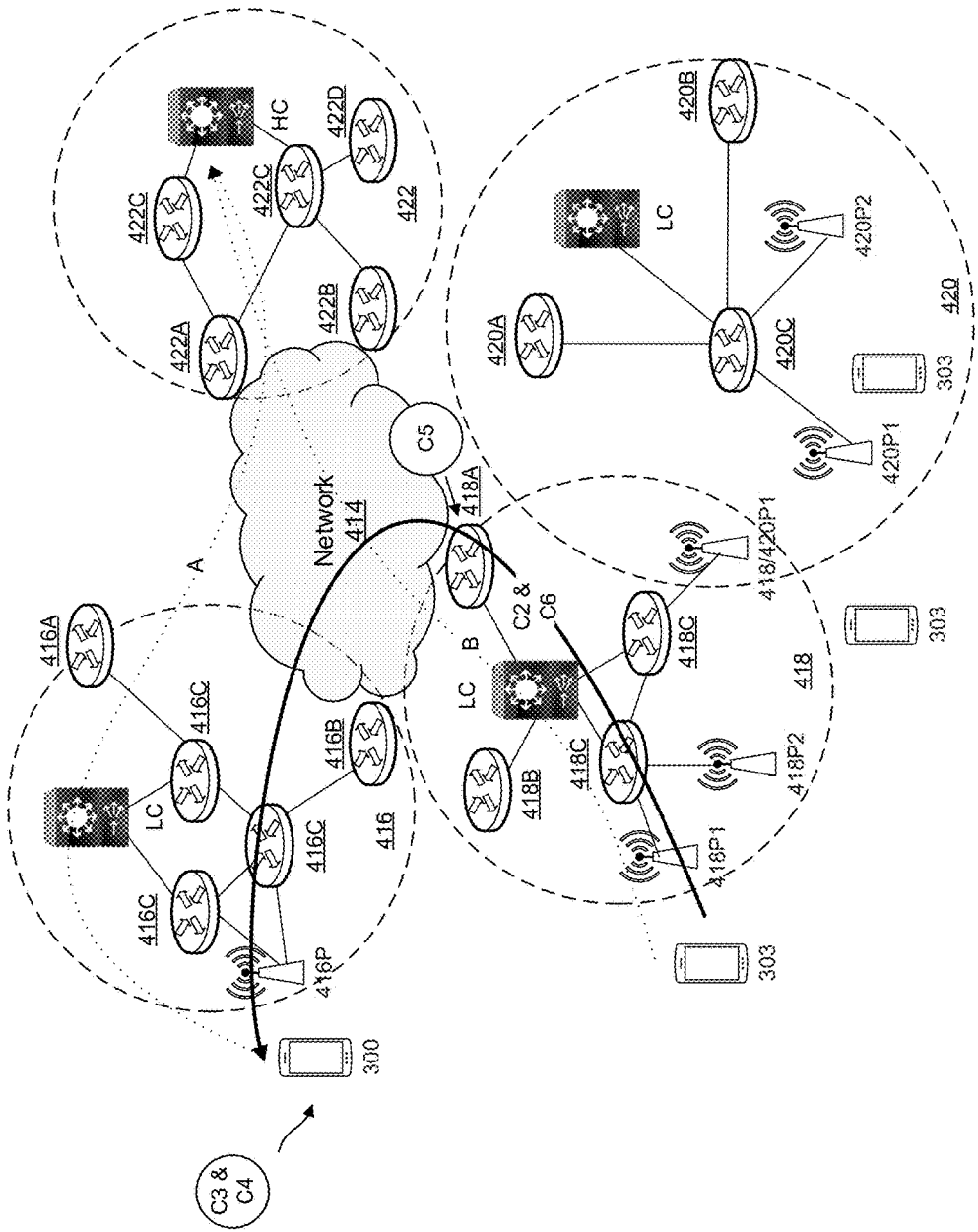

Turning to FIGS. 4D and 4E, the process continues with the requesting node 300 and the mobile producer node 303 providing request and response messages during a session. Along path C2, the mobile producer node 303 responds to the discovery request message from the requesting node 300 with a response message (data packet). The response message from the mobile producer node 303 returns location information to be used by requesting node 300.

In particular, the response message sent by the mobile producer node 303 may include additional information to assist the requesting node 300 with message forwarding. The information may include, but is not limited to (1) encrypted (current) location information for the mobile producer node 303 (in one embodiment, encrypted with requesting node's 300 public key), (2) encrypted directional (delta) metrics which indicate movement patterns, similar to a directional vector (in one embodiment, encrypted with requesting node's 300 public key), (3) encrypted mapping point information, such as coordinates or an Anycast name for the domain the mobile producer node is currently in (in one embodiment, encrypted with requesting node's 300 public key), and (4) a public key for the mapping point, which can also be encrypted in one embodiment (with the requesting node's 300 public key).

At 434, the requesting node 300 determines the mobile producer node's 303 location using estimates of RTT and directional metrics at 434. The requesting node 300, after receiving the response message from the mobile producer node 303 at a time t(Drcv), may perform the following actions at C3. The requesting node 300 extracts the location metrics and mapping point parameters from the response message received from the mobile producer node 303, and calculates the RTT d(rtt) between sending the request message and receiving the response message. In one embodiment, symmetric delays for both downlink/uplink directions (forward path is the same as reverse path) may be assumed. In another embodiment, d(rtt) may be a weighted average of the experienced round trip times. The requesting node 300 then anticipates the next request message delivery time to the mobile producer node 303 at time t(Ircv)=t(req)+0.5*d(rtt). Using the most recent t(Drcv) value and the directional metrics (e.g., speed along each direction: $(x_{met}, y_{met})$), the mobile producer node's 303 location at the time of next request message delivery can be approximated using loc(Prod)+t(diff)*loc(diff), where t(diff)=t(Ircv)−t(Drcv)+0.5*d(rtt). For example, $x_{loc,1} = x_{loc,0} + x_{met} * t(\text{diff})$.

At 436, the requesting node creates a request message with headers designed for mobile targeting flows. The request node 300, at C4, includes the new headers with one or more of the following information: the MaP identifier as a locator to deliver the request message to a matching hub in the mobile producer node's 303 current domain, the mobile producer node's 303 current location (which may be encrypted with the MaP's public key to prevent third-part access) and the mobile producer node's 303 initial location (which may also be encrypted).

At 438, the request message forwarded by the requesting node 300 is received at the MaP server 418A (at C5). The MaP server 418A uses its private key to decrypt location metrics (for the anticipated mobile producer node 303 location and previously informed location information, when available). The MaP server 418A then may use location metrics gathered from the mapping database (stored therein) to determine the point of attachment responsible for providing coverage within the area the mobile producer node 303 is expected to be currently located in. The MaP server 418A updates the locator with the point of attachment identifier and forwards the request message over a matching interface, for which the process was repeated along the path to the mobile producer node 303.

In the case where the previous location information is available, during a multi-unicast, if the previous location and current location maps to different point of attachments, the MaP server 418A can forward the request message to both point of attachments. Moreover, multiple forwarding labels (or locators) can be used to multicast if paths towards both of the point of attachments are shared, instead of performing multiple unicast transmissions (lookup on both IDs and forward on one interface, if both match to the same, or two interfaces if both match to different ones).

In one embodiment, the location metrics may be removed by the MaP server 418A from the request message before forwarding the request to the mobile producer node 303.

At 440, after the mobile producer node 303 receives the request message, the response message is forwarded with matching header information along the reverse path (C6), including the requested content. response message (data packet) forwarding may include, but is not limited to, a breadcrumb approach, which uses the names consistently (if encrypted, the encrypted name should be the name included within the data), or an overlay style forwarding (whole path or partially), which would use information on the MaP (such as the forwarding label associated with it) to be included within response message. This may be particularly useful for cases when both end hosts are mobile (consumer location metrics are included within the data to do reverse path forwarding).

Figure 4F:
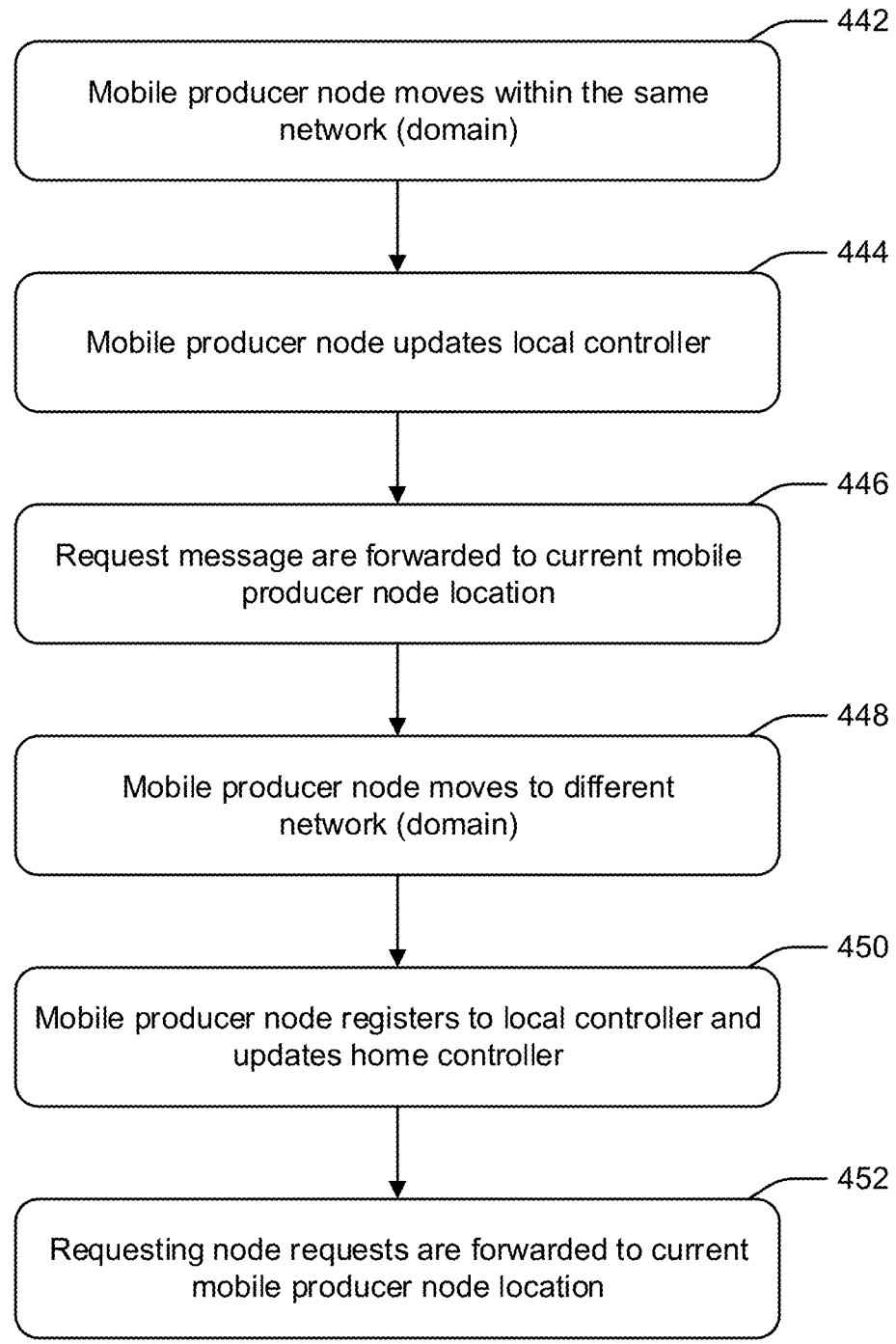
Figure 4G:
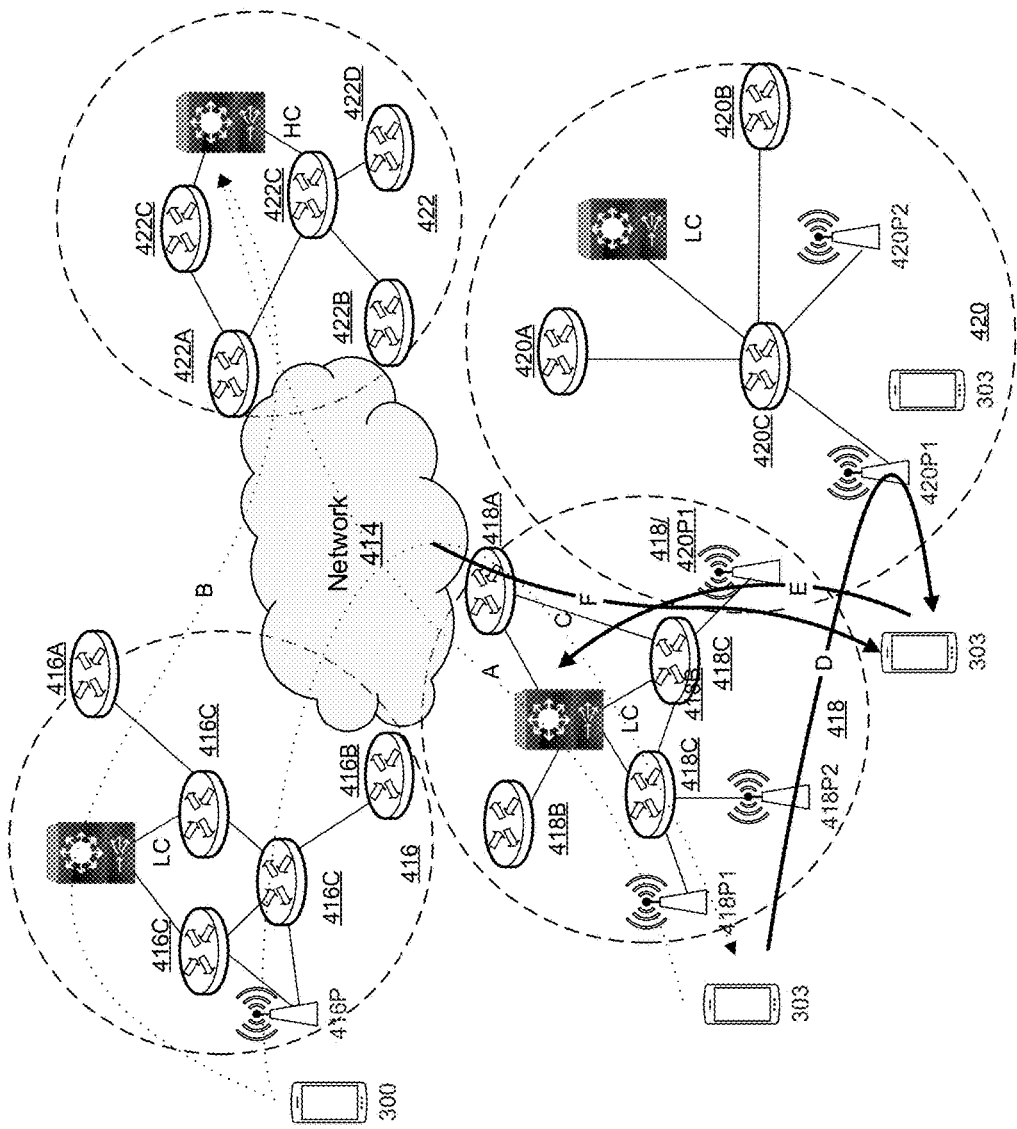
Figure 4H:
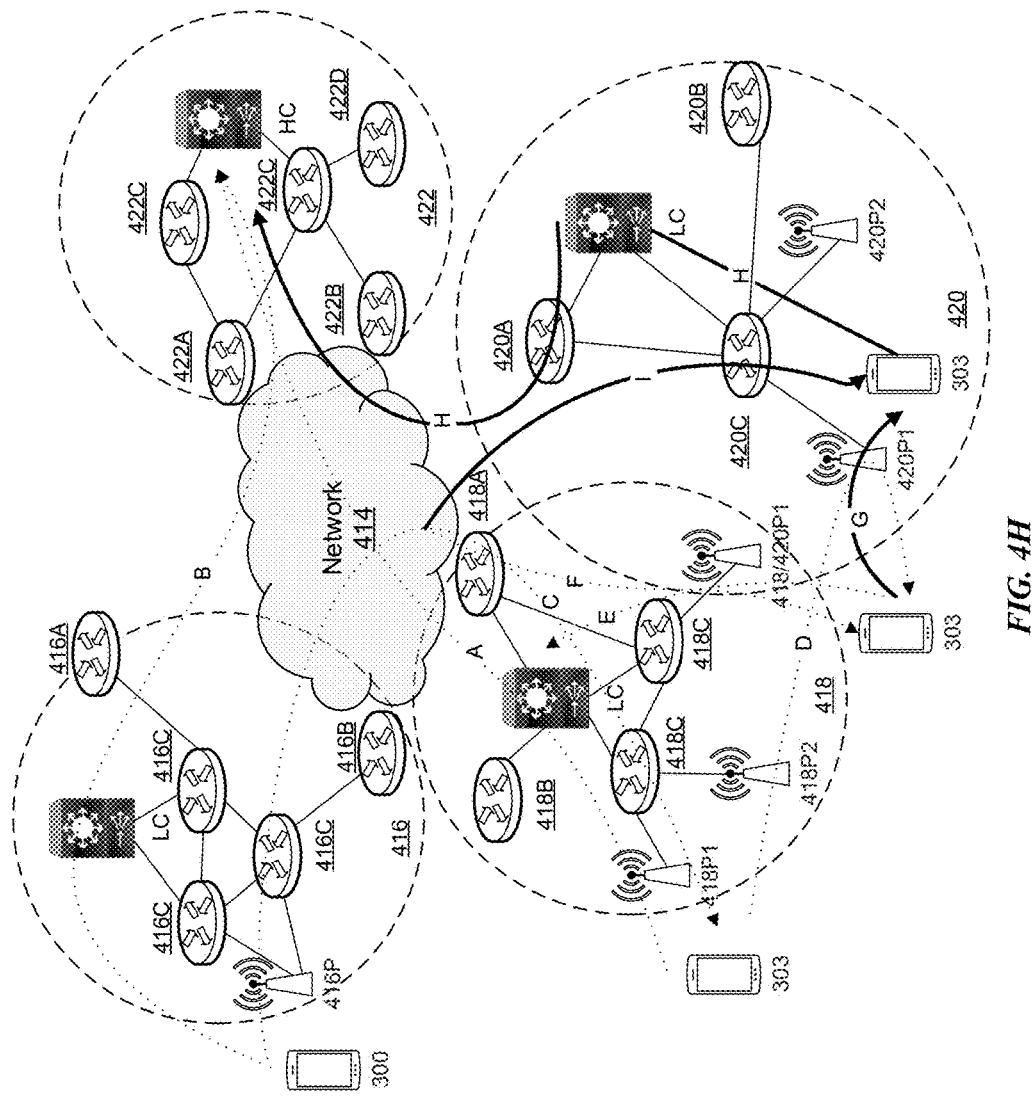

With reference to FIGS. 4F, 4G and 4H, the process continues along path D, where the mobile producer node 303 moves from point of attachment 418P1 to point of attachment 418/420P1 in the same network (domain) 418 (an intra-domain move) at 442. The mobile producer node 303 informs the requesting node 300 of the movement by sending location and direction information in the header of the response message. Subsequently, the point of attachment 418/420P1 updates the local controller in the domain of network 418 along path E at 444. At 446, along path F, the requesting node 300 forwards the request message to the current mobile producer node 303 location using the mapping service identifier and location metrics (which included in the response message from the mobile producer node 303).

At 448, the mobile producer node moves from network (domain) 418 to a different network (domain) 420 (inter-domain move) along path G. At 450, the mobile producer node 303 registers with the local controller in network 420 and updates the home controller HC (for example, via local controller LC of network 420), along path H. At 452, along path H, the requesting node 300 forwards the request message to the current mobile producer node 303 location using the mapping service identifier and location metrics (which were included in the response message from the mobile producer node 303).

Figure 5B:
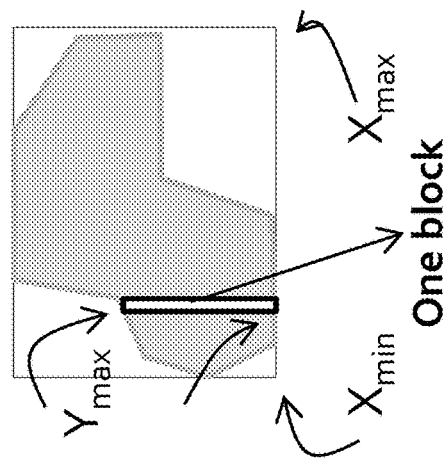
FIGS. 5A and 5B illustrate determining the location of a point of attachment within a domain of the mobile producer node.
Figure 5A:
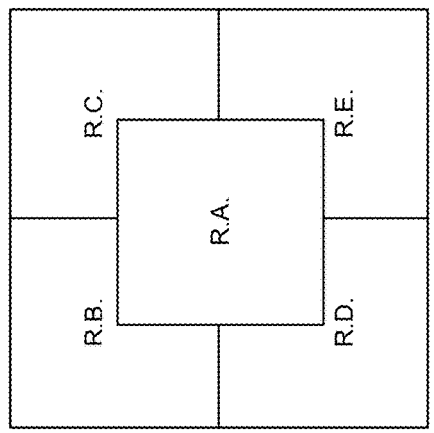

FIGS. 5A and 5B illustrate determining the location of a point of attachment within a domain of the mobile producer node. With reference to FIG. 5A, regions are created and associated with the domain (network). For example, if we assume for purposes of the example 100 m×100 m regions, then the region for location using modulo operation along each coordinate may be found. In one embodiment, two different modulo are applied—first to find region R.A, then to find regions R.B, R.C, R.D and R.E. In another embodiment, regions R.B, R.C, R.D, R.E may be found for each axis (x,y) by: if $x/100-\lfloor x/100 \rfloor <= 0.5$, then use $\lfloor x/100 \rfloor$ and $\lfloor x/100 \rfloor -1$. Otherwise, use $\lfloor x/100 \rfloor$ and $\lfloor x/100 \rfloor +1$). The same approach is applied for y-coordinates, which will give the area identifiers along each axis.

In one embodiment, since the mobile producer node 303 can be near network boundaries, the point of attachments associated with each of the four regions are included.

When calculating or determining region-based information, at least two different region types should be considered. In a first type, the regions is a rectangular-type region (not shown) for which the $X_{min}$ and $Y_{min}$ are used to determine region identifiers.

In a second type of region, the region is atypical (such as FIG. 5B) for which matching coordinates are determined. For example, assume a table that consists of $N_{block} = (X_{max} - X_{min})/L_{block}$ entries, each of which includes three sub entries, where the sub entries are $Y_{min}$, $Y_{max}$, $Identifier_{start}$, all of which can be used to determine the block identifiers, which can be implemented of size 64 bits, 64 bits, 64 bits=24 Bytes. In this case, the total size requirement would be $24 \times N_{block}$ Bytes, e.g., if X-size equals 100 km, with block size of 100 m, we would have 1000 blocks, with size requirements of ~24 KB. The mapping can be stored, for example, on a CPU cache or on-chip memory (or any other storage).

Following the above example, a two-level memory hierarchy may be used to determine the point of attachments by performing two lookups on the on-chip memory (or CPU cache) using X-region identifiers for the four region blocks R.B., R.C., R.D. and R.E., providing the corresponding bucket memory addresses, followed by performing four lookups on the memory at the given addresses to extract the point of attachment information.

The results may then be compared such that the closest regions to the given address are found. In this case, the point of attachment identifier may be used as the locator to find the next-hop.

Figure 6:
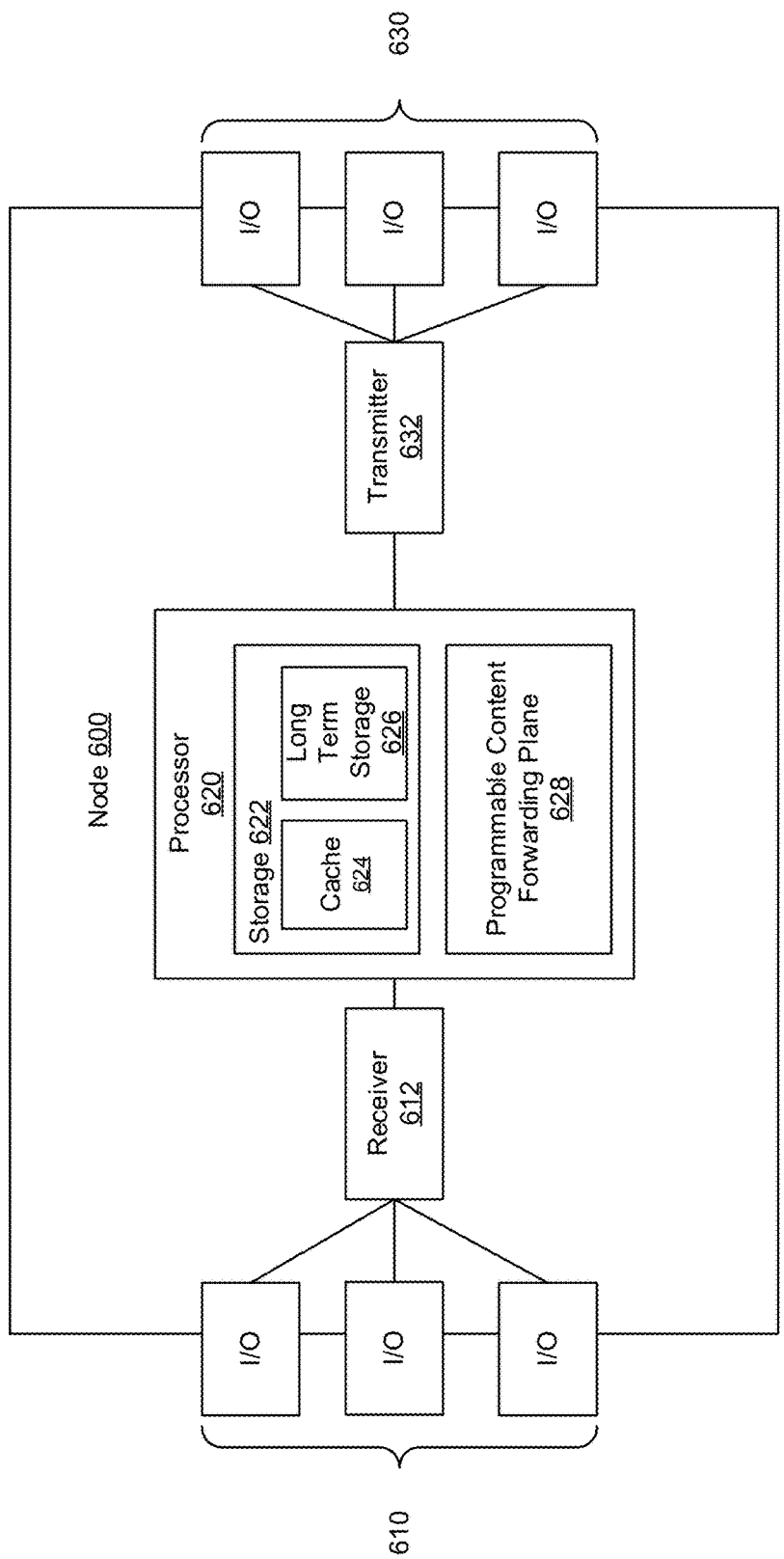
FIG. 6 illustrates an embodiment of a router in accordance with embodiments of the disclosure.

FIG. 6 illustrates an embodiment of a router in accordance with embodiments of the disclosure. The node (e.g., a router) 600 may be, for example, the content router 106 (FIG. 1) or any other node or router as described above in the ICN. The node 600 may comprise a plurality of input/output ports 610/630 and/or receivers (Rx) 612 and transmitters (Tx) 632 for receiving and transmitting data from other nodes, a processing system or processor 620 (or content aware unit), including a storage 622 and programmable content forwarding plane 628, to process data and determine which node to send the data. The node 600 may also receive Interest messages and Data messages as described above. Although illustrated as a single processor, the processor 620 is not so limited and may comprise multiple processors. The processor 620 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 620 may be configured to implement any of the schemes described herein, such as the processes illustrated in FIGS. 3B, 4A, 4C and 4E using any one or combination of steps described in the embodiments. Moreover, the processor 620 may be implemented using hardware, software, or both.

The storage 622 (or memory) may include cache 624 and long-term storage 626, and may be configured to store routing tables, forwarding tables, or other tables or information disclosed herein. Although illustrated as a single storage, storage 622 may be implemented as a combination of read only memory (ROM), random access memory (RAM), or secondary storage (e.g., one or more disk drives or tape drives used for non-volatile storage of data).

The programmable content forwarding plane 628 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 620. The programmable content forwarding plane 628 may interpret user requests for content and accordingly fetch content, e.g., based on meta-data and/or content name (prefix), from the network or other content routers and may store the content, e.g., temporarily, in storage 622. The programmable content forwarding plane 628 may then forward the cached content to the user. The programmable content forwarding plane 628 may be implemented using software, hardware, or both and may operate above the IP layer or L2.

Figure 7:
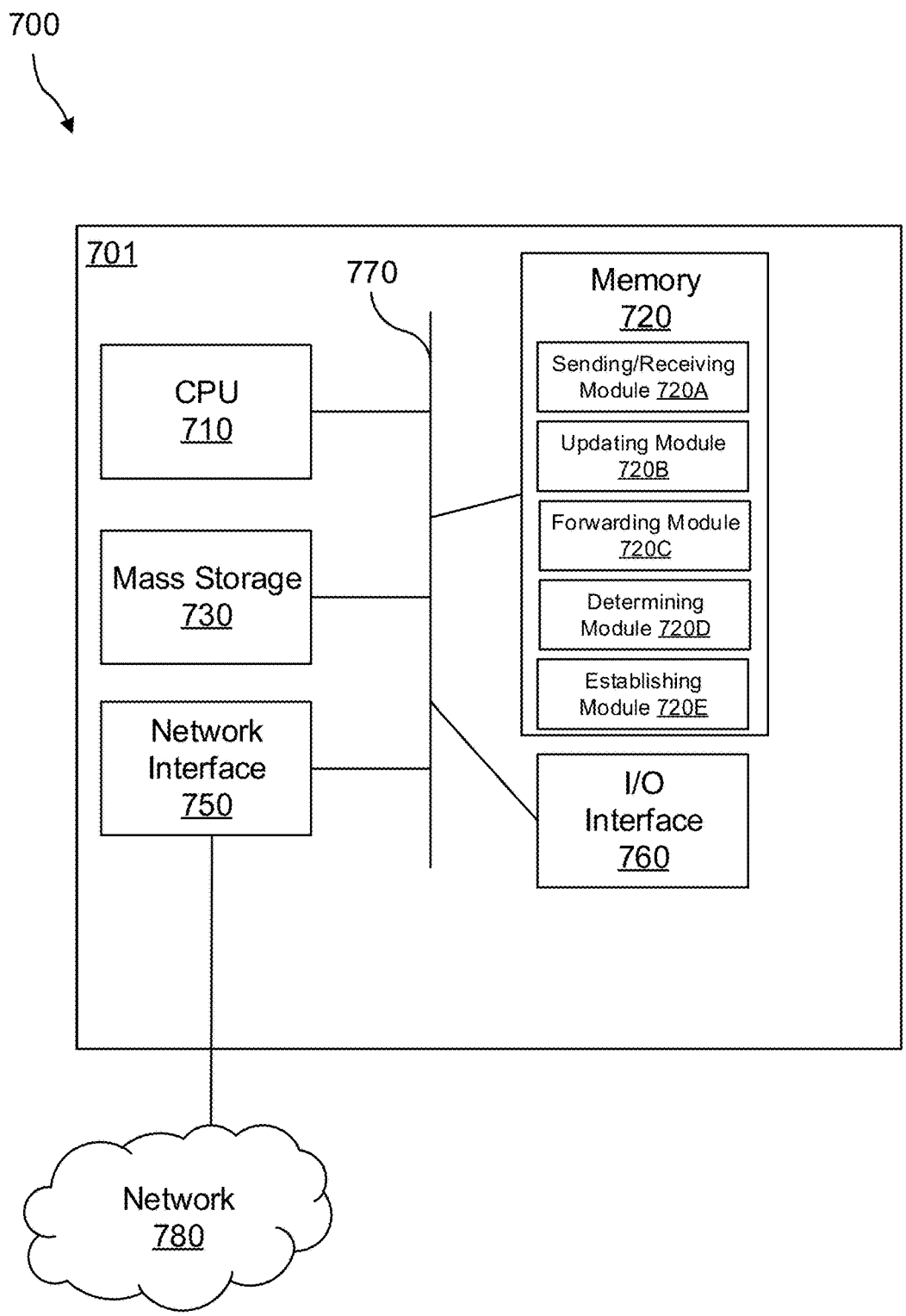
FIG. 7 illustrates a block diagram of a network system that can be used to implement various embodiments.

FIG. 7 is a block diagram of a network device 700 that can be used to implement various embodiments. Specific network devices may utilize all of the components shown, or only a subset of the components, and levels of integration may vary from device to device. Furthermore, the network device 700 may contain multiple instances of a component, such as multiple processing units, processors, memories, transmitters, receivers, etc. The network device 700 may comprise a processing unit 701 equipped with one or more input/output devices, such as network interfaces, storage interfaces, and the like. The processing unit 701 may include a central processing unit (CPU) 710, a memory 720, a mass storage device 730, and an I/O interface 760 connected to a bus 770. The bus 770 may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. In one embodiment, the memory 720 includes a sending/receiving module 720A to receive a request message from a requesting node in the ICN, as well as a registration message from a mobile producer node attached to a network component and send a response message in reply to the registration message. The sending/receiving module 720A may also receive a discovery or recovery message from the requesting node. An updating module 720B updates mapping point parameters (parameters after producer moves) when the mobile producer node moves from a first network component to a second network component. A forwarding module 720C forwards the request message from the requesting node to the mobile producer node using the updated mapping point parameters, a determining module 720D that determines point of attachments responsible for providing coverage to the mobile producer nodes and determining the location of the mobile producer node using estimated metrics, and an establishing module 720E establishes sessions between the requesting node and the mobile producer node.

The mass storage device 730 may comprise any type of storage device configured to store data, programs, and other information and to make the data, programs, and other information accessible via the bus 770. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

In some embodiments, the methodology provides the following advantages. The need to provide updates from the home/local controllers during handovers (e.g., at the boundaries, PoAs, service routers) is removed, and location-based packet forwarding occurs in-between discovery/recovery events, i.e., routers along the way do not interact with the controllers to deliver requests to the mobile producer nodes. The methodology also supports host-driven resolution, recovery and packet forwarding, enables secure connectivity between end hosts, continues to utilize PIT to aggregate requests coming from different consumers targeting the same mobile producer content (for instance in the case of video conferencing or multicast streaming involving mobile hosts), and allows decentralized operation by supporting quick recovery after handovers with no reliance on dedicated controllers to monitor host mobility.

Other advantages include, new packet formats (and optional header fields) to support secure location-driven data pulling, per default ICN content handling, a new servicing node type (mapping point) or a service integrated to border routers (mapping service) to provide anycast location-mapping services, and a new location-centric routing technique to deliver requests to mobile producers after a successful initial discovery phase.

The methodology also advantageously creates new coordinates to associate with nodes (not necessarily geographic coordinates), where routing is performed on shortest path to destination. The shortest path may be represented with shortest distance to destination, which is calculated on the fly as packet is forwarded to the next hop closest to the destination. The methodology is also suitable for small networks and constant hosts.

In one advantageous embodiment, "symbolic" regions are created with areas defined symbolically (for instance, names, IDs), and nodes can access IDs associated with regions/areas.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a network component of an information centric network (ICN) for providing seamless mobility to a mobile producer node, comprising:
   receiving a request message from a requesting node in the ICN, the request message including mapping point parameters that include an identifier to identify a mapping server that serves requests targeting the mobile producer node and determined location information of the mobile producer node, wherein the determined location information in the request message is determined based on location information in a previous response message from the mobile producer node;
   determining multiple points of attachment within a domain of the mobile producer node;
   determining one of the multiple points of attachment nearest to the mobile producer node based on the determined location information received from the requesting node; and
   forwarding the request message from the requesting node to the mobile producer node through the point of attachment nearest to the mobile producer node.

2. The method of claim 1, further comprising:
   receiving a registration message from the mobile producer node attached to the first network component;
   sending a response message in response to the registration message, the response message including the mapping point parameters;
   receiving a discovery or recovery message from the requesting node, the discovery or recovery message including a namespace for the mobile producer node hosting the content; and
   returning locator information for the mobile producer node in response to the discovery or recovery message.

3. The method of claim 1, wherein the map server stores a coverage area of each of points of attachments.

4. The method of claim 1, wherein the request further comprises a location of the mobile producer node as reported by the mobile producer node at a time of transmitting the previous response message to the requesting node.

5. The method according to claim 4, wherein determining, based on the determined location information, a point of attachment responsible for providing coverage including the determined location of the mobile produce node comprises:
   determining a first point of attachment corresponding to the determined location of the mobile producer node;

determining a second point of attachment corresponding to the location as reported by the mobile producer node at a time of transmitting a previous response message to the requesting node.

6. The method according to claim 5, wherein the forwarding the request message from the requesting node to the mobile producer node through the point of attachment comprises:

forwarding the request message from the requesting node to both the first and second points of attachment.

7. The method of claim 1, wherein determining the multiple points of attachment within a domain of the mobile producer node from location information comprises:

assigning the multiple points of attachment to regions of the domain based on a corresponding physical location;

creating a database to determine the regions associated with the corresponding physical location;

extracting a candidate set of the multiple points of attachment and information using the mobile producer node's location; and selecting one or more of the closest points of attachment serving the mobile producer node.

8. A network device for seamless mobility in an information centric network (ICN), comprising:

a non-transitory memory storage comprising instructions; and one or more processors in communication with the memory, wherein the one or more processors execute the instructions to:

receive a request message from a requesting node in the information centric network, the request message including mapping point parameters that include an identifier to identify a mapping server that serves requests targeting the mobile producer node and determined location information of the mobile producer node, wherein the determined location information in the request message is determined based on location information in a previous response message from the mobile producer node;

determine multiple points of attachment within a domain of the mobile producer node;

determine one of the multiple points of attachment nearest to the mobile producer node based on the determined location information received from the requesting node; and forward the request message from the requesting node to the mobile producer node through the point of attachment nearest to the mobile producer node.

9. The network device of claim 8, wherein, when the map server stores a coverage area of each of points of attachments.

10. The network device of claim 8, wherein location information in a previous response message includes a current location and directional metrics of the mobile producer node.

11. The method of claim 8, the one or more processors perform the steps of determining the multiple points of attachment multiple points of attachment within a domain of the mobile producer node from location information comprises:

assigning the multiple points of attachment to regions of the domain based on a corresponding physical location;

creating a database to determine the regions associated with the corresponding physical location;

extracting a candidate set of the multiple points of attachment and information using the mobile producer node's location; and selecting one or more of the closest points of attachment serving the mobile producer node.

* * * * *